United States Patent [19]

Kamo et al.

[11] 3,782,349

[45] Jan. 1, 1974

[54] INTAKE AIR TEMPERATURE AUTOMATIC ADJUSTING DEVICE AND AIR CLEANER WITH SUCH DEVICE FOR INTERNAL COMBUSTION ENGINES

[75] Inventors: Hideo Kamo, Chiryo; Hajime Akado, Karaiya; Yasutosi Kato, Anjo, all of Japan

[73] Assignee: Nippondenso Co., Ltd., Kariya-shi, Aichi-ken, Japan

[22] Filed: Oct. 20, 1972

[21] Appl. No.: 299,449

[30] Foreign Application Priority Data

Oct. 22, 1971 Japan ............................ 46/84211
Oct. 30, 1971 Japan ............................ 46/86503
July 22, 1972 Japan ............................ 47/73706

[52] U.S. Cl. ................ 123/122 D, 251/11, 251/77, 236/101

[51] Int. Cl. ................................ F02m 35/04

[58] Field of Search .................. 123/122 R, 122 D, 123/119 F; 251/58, 11, 77; 236/99, 100, 101, 102, 51

[56] References Cited

UNITED STATES PATENTS

| | | | |
|---|---|---|---|
| 2,781,032 | 2/1957 | Sebok et al. | 123/122 D |
| 2,821,181 | 1/1958 | Dolza | 123/122 D |
| 3,248,094 | 4/1966 | Ball | 123/119 F X |
| 3,272,486 | 9/1966 | Lucas et al. | 123/119 F X |
| 3,450,119 | 6/1969 | Sendelbach | 123/122 D |
| 3,481,119 | 12/1969 | McKinlay | 123/122 D X |
| 3,563,007 | 2/1971 | Clarke | 123/122 D X |
| 3,610,568 | 10/1971 | Duwe | 251/58 |
| 3,653,366 | 4/1972 | Hoferer | 123/122 D |

FOREIGN PATENTS OR APPLICATIONS

| | | | |
|---|---|---|---|
| 868,897 | 10/1944 | France | 123/122 D |

*Primary Examiner*—Al Lawrence Smith
*Attorney*—John W. Malley et al.

[57] ABSTRACT

An intake air temperature automatic adjusting device for internal combustion engines, in which a temperature feeler having a heat-sensitive expanding compound sealed therein is provided in a cold air intake pipe and a push rod adapted to be operated by said feeler and having a crank-shaped arm formed at one end thereof is engaged at said arm with a cam having formed therein a crank-shaped slot composed of a first slot section and a second slot section and further a directional control valve operating incident to movement of said cam for regulating the amounts of air supplied from said cold air intake pipe and a hot air intake pipe connected thereto is provided in said cold air intake pipe, whereby when said push rod is operated by said feeler, said directional control valve is shifted between said cold air intake pipe and hot air intake pipe, with said arm sliding in the first slot section of the crank-shaped slot of the cam and, when said push rod is further operated in excess of its preset stroke, the amount of movement of said push rod is absorbed by said cam, with said arm sliding in the second section of said crank-shaped slot.

3 Claims, 9 Drawing Figures

III
II
14
16
13
15
5
2
1
3
32
46
33
47
36
35
37
45
42
43
e
40
34
34
38a
38
35a
39
41
37a
31
44

INTAKE AIR TEMPERATURE AUTOMATIC ADJUSTING DEVICE AND AIR CLEANER WITH SUCH DEVICE FOR INTERNAL COMBUSTION ENGINES

BACKGROUND OF THE INVENTION

1. Field of the Invention

This invention relates to an intake air temperature automatic adjusting device with which the intake air temperature of internal combustion engines, for example, for automobiles can be automatically adjusted, for example, within an air cleaner and to improvements in the air cleaner with such a device.

2. Description of the Prior Arts

A main air intake pipe of an air cleaner having a contentional intake air temperature automatic adjusting device for internal combustion engines has been provided with a hot air intake pipe for sucking hot air heated by the exhaust mainfold of an engine and a directional control valve for selectively connecting said main air intake pipe and hot air intape pipe to the air cleaner, and said directional control valve has been operated by a plunger of a heat senser or feeler with a heat-sensitive expanding compound, e.g., wax, sealed therein. However, such an arrangement has had the disadvantage that, with the ambient temperature of the feeler elevating above a preset temperature, the stroke of the feeler plunger bedomes larger than a preset stroke and the directional control valve is held immovable in its preset open position, causing deformation or breakage of said feeler plunger. If an arrangement is made such that the directional control valve is still operable even when the plunger stroke of the feeler exceeds the preset stroke, there would be the disadvantage that the preset open position of the directional control valve cannot be obtained and hence the required intake air temperature cannot be obtained within the preset stroke of the feeler plunger.

There has also been known an intake temperature automatic adjusting device of the type described in which the directional control valve is directly operated by the axial thrust of the plunger of a feeler having a heat-sensitive expanding compound sealed therein, or a device in which diaphragm means having an atmospheric pressure chamber and a negative pressure chamber separated from each other by a diaphragm is provided in the main air intake pipe of the air cleaner, in operative association with a bimetallic feeler and the directional control valve is operated by the thrust of the diaphgram generated when the intake manifold vacuum pressure of the engine is introduced into the negative pressure chamber of said diaphragm means, but such a device has had the disadvantage that, when the engine is rapidly accelerated or shifted into a high load operation phase at a relatively low temperature, e.g., below about 25° C., the directional control valve provided in the main air intake pipe of the air cleaner constitutes a flow resistance to the intake air, so that the amount of air demanded by the engine cannot be obtained and accordingly the engine output decreases.

SUMMARY OF THE INVENTION

It is, therefore, an object of the present invention to provide, in order to obviate the first-mentioned disadvantage of the conventional device, an intake air temperature automatic adjusting device for internal combustion engines, in which a cam in connected with a directional control valve to absorb an amount of movement of a push rod in excess of a preset stroke, whereby the operation of said directional control valve is rendered smooth and the temperature of air sucked into the engine can be automatically adjusted.

Another object of the invention is to provide an intake air temperature automatic adjusting device for internal combustion engines, in which a cam is connected with a directional control valve to absorb an amount of movement of a push rod in excess of a preset stroke, whereby the operation of said directional control valve is rendered smooth and the temperature of air sucked into the engine can be automatically adjusted, and further a clearance between an arm and a crank-shaped slot is absorbed by a spring, whereby vibratory noises of the directional control valve is minimized to the acceptable level.

Still another object of the invention is to provide an air cleaner with an intake air temperature automatic adjusting device, for internal combustion engines, in which an auxiliary air intake port is provided in a casing of the air cleaner and diaphragm means to operate a plate valve which opens and closes said auxiliary air intake port is connected with the intake manifold of the engine, whereby, when the engine is rapidly accelerated or shifted into a high load operation phase, the intake air can be sucked into said casing from said auxiliary air intake port and thus the amount of air demanded by the engine can be fed into said casing.

The present invention will be described in further detail hereunder with reference to the accompanying drawings in which same numerals indicate same or similar parts.

DESCRIPTION OF THE PREFERRED EMBODIMENTS

Figure 1:
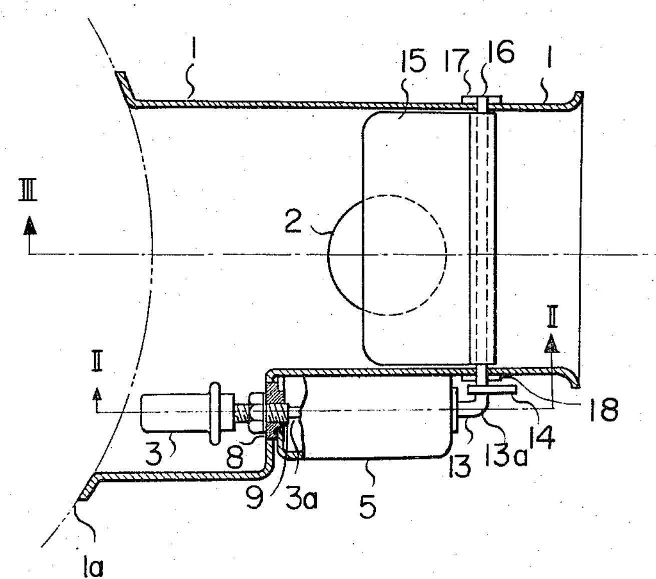
FIG. 1 is a fragmentary transverse sectional view of an air cleaner having an embodiment of the intake air temperature automatic adjusting device according to the invention.
Figure 2:
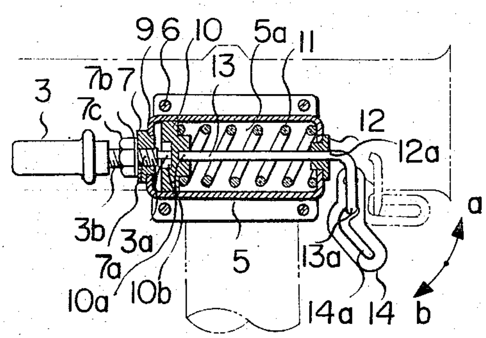
FIG. 2 is a fragmentary vertical sectional view of the air cleaner taken along the line II—II of FIG. 1.
Figure 3:
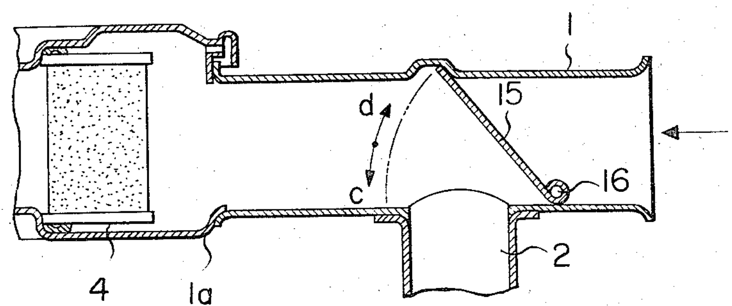
FIG. 3 is a fragmentary vertical sectional view of the air cleaner taken along the line III—III of FIG. 1.
Figure 4:
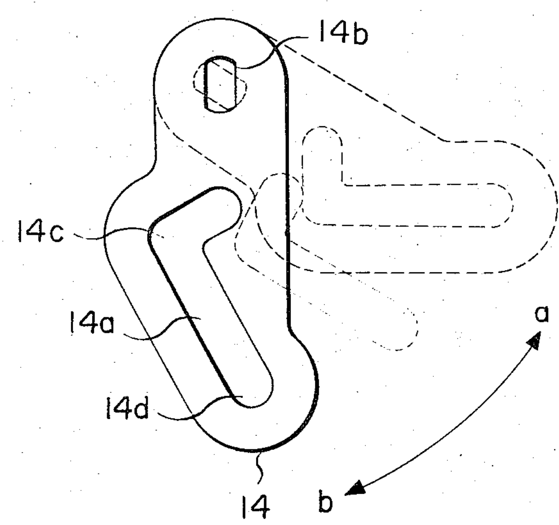
FIG. 4 is an enlarged plan view of the cam which is the essential element of the intake air temperature automatic adjusting device of the invention.

With reference first to FIG. 1 in which is shown a first embodiment of the device of this invention, reference numeral 1 designates a main air intake pipe of an air cleaner, through which cold air in the engine room is sucked into said air cleaner. Reference numeral 2 designates a hot air intake pipe through which hot air heated by the exhaust mainfold, for example, through a heat collector, not shown, enclosing said exhaust mainfold is sucked into the air cleaner. Reference numeral 3 designates a heat-sensitive element or a feeler provided inside the main air intake pipe at a location as close to a case 1a of the air cleaner as possible and having a heat-sensitive expanding compound, e.g., wax, sealed therein. This feeler 3 is exposed to the cold air sucked from the engine room through the main air intake pipe 1 or the hot air sucked through the hot air intake pipe 2 or the mixture thereof, and thereby senses the temperature of air flowing toward the air cleaner. As stated, the feeler 3 has a heat-sensitive expanding compound, e.g., wax, sealed therein which begins to expand, for example, at a temperature of 20° to 30° C. and a plunger **3*a* which is moved axially out or into a housing 5 as the temperature sensed by the heat-sensitive expanding compound increases or decreases. Reference numeral 5 designates the housing fixed to one side surface of the main air intake pipe 1 by means of small screws 6 and defining therein a housing chamber 5*a* which is isolated from the exterior contaminated air. Reference numeral 7 designates a bush fitted in openings 8, 9 formed in the main air intake pipe 1 and the housing 5, and a plunger 3*a* of the feeler 3 is extended through an axial hollow of said bush 7. Reference numeral 10 designates a piston which moves axially within the housing 5 incident to the movement of the feeler plunger 3*a*. This piston 10, when the temperature sensed by the feeler 3 falls, returns to its original position under the biasing force of a spring 11 disposed in the housing 5. The feeler 3 is secured in position by an externally threaded member 3*b* which is mounted around the feeler plunger 3*a* and threadably engaged with internal threads 7*a* of the bush 7, and a nut 7*c* which is tightening said externally threaded member 7*a* through a spring washer 7*b*. Reference numeral 12 designates a bush fitted into the housing 5 and having an opening 12*a* of a suitable size not to interfere with a sliding movement of a push rod 13 extending through said opening 12*a*. The piston 10 is formed with a recess 10*a* for receiving the feeler plunger 3*a*, said recess being large enough not to impair the movement of the feeler plunger 3*a* even if the axis of said feeler plunger and the axis of said piston 10 are out of alignment in the assembled state of the device. The piston 10 is also formed with a hole 10*b* on the opposite side of the recess 10*a*, in which the push rod 13 is fixed as by threads or shrinkage-fit. Thus, it will be understood that the push rod 13 makes an axial movement incident to the axial movement of the piston 10. Reference numeral 13*a* designates a crank-shaped arm fromed at the other end of the push rod 13 which is fixed to the piston 10 as described above. The end extremity of the arm 13*a* is slidably received in a crank-shaped slot 14*a* formed in a cam 14. Reference numeral 15 designates a plate-like directional control valve for regulating the amount of air sucked through the main air intake pipe 1 and the amount of air sucked through the hot air intake pipe 2, 16 a rotary shaft of said directional control valve 15, and 17, 18 bearings for said rotary shaft 16, which are fixed to the main air intake pipe 1. The cam 14 is fixed to one end of the rotary shaft 16. The configuration of the cam 14 will be described with reference to its enlarged view shown in FIG. 4. As shown, the cam 14 is formed with the crank-shaped slot 14*a* and a through-hole 14*b* for fixing the rotary shaft 16 of the directional control valve 15 therein. The crank-shaped slot 14*a* is so shaped that, when the arm 13*a* slides in a first section 14*c* of said slot 14*a*, the cam 14 is caused to rotate about the through-hole 14*b* in the direction of the arrow *a* or *b* and concurrently the directional control valve 15 regulates the amount of air from the main air intake pipe 1 and the amount of air from the hot air intake pipe 2, and when the directional control valve 15 reaches a position to close the hot air intake pipe 2, the arm 13*a* slides in a second section 14*d* of the crank-shaped slot 14*a* while absorbing an amount of movement of the push rod 13** in excess of its preset stroke.

The angle *a* formed by the first section **14*c* and the second section 14*d* of the slot 14*a* of the cam 14 may be determined in relation with the angle of the operation range of the directional control valve 15 so as to provide for smooth sliding movement of the arm 13*a*, and, for instance, when the angular operation range of the directional control valve 15 is from 45° to 90°, a satisfactory operation of the directional control valve 15 may be obtained by forming the first section 14*c* and second section 14*d* of the slot 14** at an angle of about 90° – 180° relative to each other.

Now, the operation of the first embodiment of the invention constructed as described above will be explained. In the event when the atmospheric temperature at the start of the engine is lower than the temperature at which the heat-sensitive expanding compound, e.g., wax, accommodated in the feeler 3, begins to expand, the directional control valve 15 is set in a position to permit suction of air only from the hot air intake pipe 2, whereby air heated by the exhaust manifold not shown is sucked into the air cleaner, while heating the feeler 3. When the feeler 3 has been elevated to the temperature at which the heat-sensitive expanding compound therein begins to expand, the plunger **3*a* of said feeler causes the piston 10 to move in the axial direction while compressing the spring 11, which in turn pushes the piston 10 and the push rod 13, causing the arm 13*a* of said push rod 13 to slide in the first section 14*c* of the crank-shaped slot 14*a* of the cam 14 and thus causing the cam 14 to rotate about the through-hole 14*b* in the direction of the arrow *a*. Consequently, the plate-like directional control valve is caused to make a pivotal movement in the direction of the arrow *c* through the rotary shaft 16 to open the main air intake pipe 1 and permit suction of cold air within the engine room not shown. In the event when the feeler plunger 3*a* moves beyond its preset stroke even after the hot air intake pipe 2 has been completely closed by the directional control valve 15, the arm 13*a* slides in the section section 14*d* of the crank-shaped slot 14a of the cam 14, so that the push rod 13 slides on the inner surface of the axial hollow 12*a* of the bush 12 without undergoing any resistance and the biasing force of the spring 11 only acts on the feeler 3, the piston 10, the push rod 13 and the cam 14. Therefore, it will be understood that, by properly selecting the chracteristics of the spring 11** with respect to the thrust of expansion of the heat-sensitive expanding compound, e.g., wax, sealed in the feeler 3, the occurrence of a frictional force, or deformation and breakage of the component parts of the device, can be avoided which are detrimental to the operation of the device, and an extremely smooth operation of the directional control valve 15 can be obtained. The smooth operation of the directional control valve 15 is further ensured by the fact that the feeler plunger 3*a*, the piston 10, the spring 11 and the push rod 13 are housed in the housing chamber 5*a* so that their sliding surfaces are not exposed directly to air contaminated with dusts and water particles. On the other hand, when the temperature of the air contacting the feeler 3 falls and the heat-sensitive expanding compound, e.g., wax, in said feeler contracts, the plunger 3*a* moves into the feeler 3 and the piston 10 moves toward the plunger 3*a* under the biasing force of the spring 11, while pulling the push rod 13 in the same direction, so that the arm 13*a* slides in the first section 14*c* of the crank-shaped slot 14*a* of the cam 14, causing said cam 14 to make a pivotal movement in the direction of the arrow *b* and hence causing the directional control valve 15 to make a pivotal movement in the direction of the arrow *d* through the rotary shaft 16. Thus, the main air intake pipe 1 is closed and hot air is sucked into the air cleaner 4 from the hot air intake pipe 2. In the manner described, either the cold air within the engine room supplied through the main air intake pipe 1 or hot air supplied through the hot air intake pipe 2, or the mixture thereof, is sucked into the air cleaner 4 depending upon the position of the directional control valve 15 operated as described above, and thus, the temperature of the intake air is automatically adjusted to a predetermined temperature.

Figure 5:
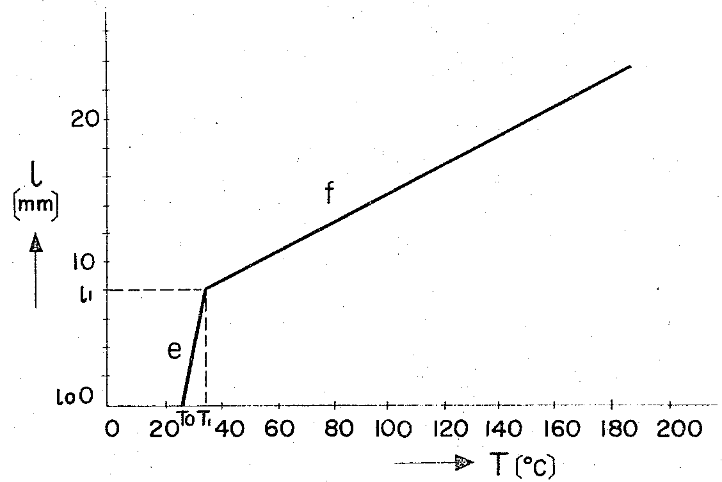
FIG. 5 is a characteristic diagram showing the relationship between the plunger stroke and the temperature of the feeler 3, having wax sealed therein, of the intake air temperature automatic adjusting device of the invention.

The relationship between the stroke $l$ (mm) of the feeler plunger 3*a* and the temperature T (°C.) sensed by the feeler 3 will be described in detail with reference to FIG. 5. With $T_0$ representing the temperature at which the wax sealed in the feeler 3 begins to transform from the solid phase to liquid phase and expand rapidly, with the air temperature rising, and which is, for example, from 20° to 35° C., $T_1$ representing the temperature at which the wax has completely transformed from the solid phase to liquid phase, and $l_0$ representing the standard stroke of the feeler plunger at the temperature $T_0$, the wax remains in its solid phase with its volume being unchanged at temperatures below $T_0$ and hence the plunger stroke $l_0$ is constant. The plunger stroke increased rapidly from $l_0$ to $l_1$ between the temperatures $T_0$ and $T_1$, as indicated by the straight line *e*, and increases gently at temperatures above $T_1$, as indicated by the straight line *f*, with the wax transforming into the liquid phase and expanding. In the present invention, in view of the foregoing, the liner motion of the feeler plunger from the stroke $l_0$ to $l_1$ within the temperature range in which the expansion ratio of the wax is large is utilized for causing a rotary motion of the directional control valve 15 and a further movement the plunger beyond the stroke $l_1$ after the directional control valve 15 has stopped its rotary motion is selected to take place within the temperature range higher than the temperature corresponding to the stroke $l_1$, so that a satisfactory operation of said directional control valve 15 can be obtained and a stroke of the push rod 13 beyond its preset stroke can be absorbed.

It is to be understood that, while in the embodiment described above, the plate-like directional control valve 15 is provided in the main air intake pipe 1 constituting a cold air passage, to selectively connecting the hot air intake pipe 2 and said main air intake pipe 1 to the air cleaner, said plate-like directional control valve 15 may be provided in a main air discharge pipe constituting a cold air passage to selectively opening or closing the hot air intake pipe 2 and said main air discharge pipe, on the occasion when the air cleaner is not directly connected to a carburetor.

It is also to be understood that, while in the embodiment described above, wax was used as the heat-sensitive expanding compound to be sealed in the feeler 3, a coolant or the like may be used in the feeler, and in this case, the push rod 13 is connected directly to the feeler having such heat-sensitive expanding compound sealed therein to open and close the directional control valve 15 through the cam 14 and absorb a movement of the push rod 13 in excess of its preset stroke.

As described above, the first embodiment of the invention comprises the feeler 3 having a heat-sensitive expanding compound sealed therein and provided in the cold air intake pipe 1, the push rod 13 operated by said feeler 3 and having the crank-shaped arm 13*a* at one end thereof, the cam 14 engaged with said arm 13*a* and having formed therein the crank-shaped slot 14*a* composed of the first slot section 14*c* and second slot section 14*d*, and the directional control valve 15 provided in said cold air intake pipe 1 for regulating the amount of air supplied from said cold air intake pipe 1 and the amount of air supplied from the hot air intake pipe 2, said directional control valve 15 being operated between said cold air intake pipe 1 and said hot air intake pipe 2 from said feeler 3 through said push rod 13 when the arm 13*a* of said push rod moves within the first section 14*c* of said crank-shaped slot 14*a* and said cam absorbing a further movement of said push rod 13 in excess of its preset stroke after said directional control valve 15 has been brought to halt, with the arm 13*a* moving within the second section 14*d* of said crank-shaped slot 14*a*; and, there-fore, has the excellent advantage that deformation and breakage of the push rod 13, the cam 14, etc. can be avoided and a very smooth operation of the directional control valve 15 can be obtained. Additionally, the device has the excellent advantage that the cold air intake pipe 1 and hot air intake pipe 2 can be selectively opened or closed in a satisfactory manner by the directional control valve 15 operated from the feeler 3 and thereby the temperature of the intake air can be automatically adjusted as demanded by the engine.

Figure 6:
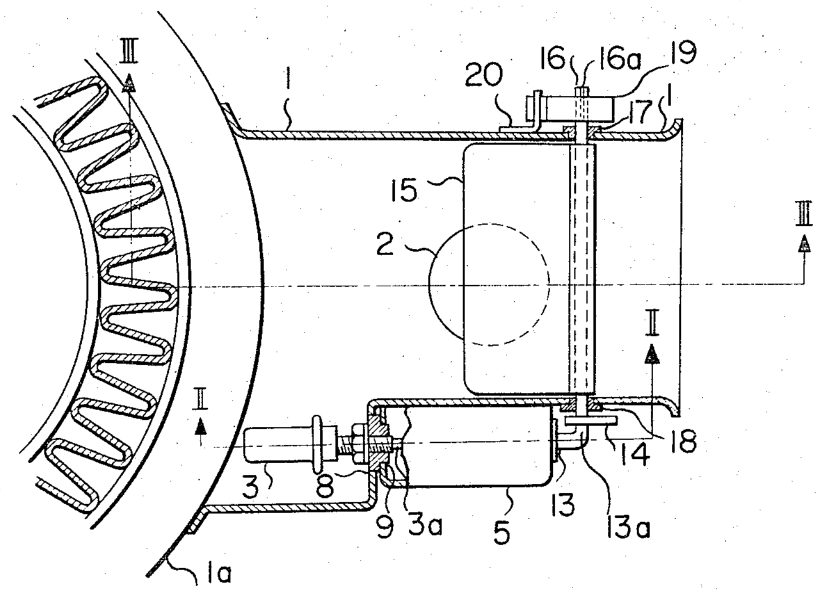
FIG. 6 is a fragmentary transverse sectional view of an air cleaner having another embodiment of the intake air temperature automatic adjusting device of the invention.
Figure 7:
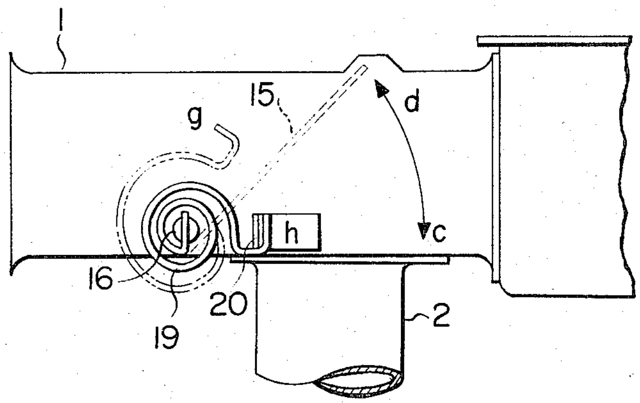
FIG. 7 is a backside view of the air cleaner shown in FIG. 6.

With reference now to FIGS. 6 and 7 there is shown a second embodiment of the invention which is similar to the first embodiment described above but further comprises a spring 19 for absorbing clearance between the arm 13*a* and the crank-shaped slot 14*a*. In this embodiment, the rotary shaft 16 is formed of one end thereof with a slit 16*a* in which the inner end of a spiral spring 19 is tightly fitted. The other or outer end of the spring 19 is securely anchored to a clamp 20 fixed to the main air intake pipe 1. In anchoring the outer end of the spiral spring 19, it is pulled with force from its relaxed position *g* to the anchoring position *h* and thus the rotary shaft 16 is urged to rotate in the direction of the arrow *c* with a spring load about 10 – 20 percent of the mounting load of the spring 11. Therefore, vibratory noise generated by the directional control valve 15 due to the clearance between the arm 13*a* and the crank-shaped slot 14*a* is absorbed by the spiral spring 19 which biases slightly the cam 14 to rotate in the direction of the arrow *a*. Namely, the clearance between the arm 13*a* and the crank-shaped slot 14*a* can be absorbed by a slight spring load of the spiral spring 19 and thereby the vibratory noise of the directional control valve 15 caused by engine vibrations can be absorbed.

In the operation of the second embodiment described above, when the plunger stroke of the feeler 3*a* exceeds the preset stroke, the arm 13*a* slides in the second section 14*d* of the crank-shaped slot 14a of the cam 14, as in the first embodiment, so that the push rod 13 is slidable on the inner surface of the axial hollow of the bush 12 without undergoing any resistance. In this case, the feeler 3, the piston 10, the push rod 13 and the cam 14 are subjected to the biasing force of the compressed spring 11 and the slight force of the spiral spring 19. Therefore, by properly selecting the characteristics of the spring 11 and spiral spring 19 relative to the thrust of expansion of the heat-sensitive expanding compound, e.g., wax, sealed in the feeler 3, a very smooth operation of the directional control valve 15 can be obtained, without friction, and deformation and breakage of the component parts of the device, which impair the operation of the device.

Figure 8:
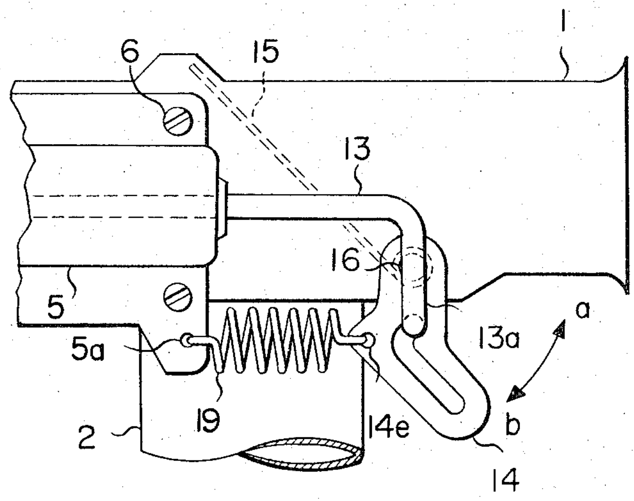
FIG. 8 is a side view of the essential portion of still another embodiment of the intake air temperature automatic adjusting device of the invention.

Although in the second embodiment described above, the clearance between the arm 13*a* and the crank-shaped slot 14*a* is absorbed by the spiral spring 19 connected to the rotary shaft 16, an arrangement may alternatively be made for the same purpose, as shown in FIG. 8 in which is shown a third embodiment of the invention. In the third embodiment shown in FIG. 8, a coil spring 19 is provided, with one end thereof anchored in a small hole 14*e* formed in the cam 14 and the other end anchored in a small hole 5*a* formed in the housing 5, to urge the rotary shaft 16 to rotate in the direction of the arrow *b* and thereby to absorb the clearance between the arm 13*a* and the crank-shaped slot 14*a*.

Figure 9:
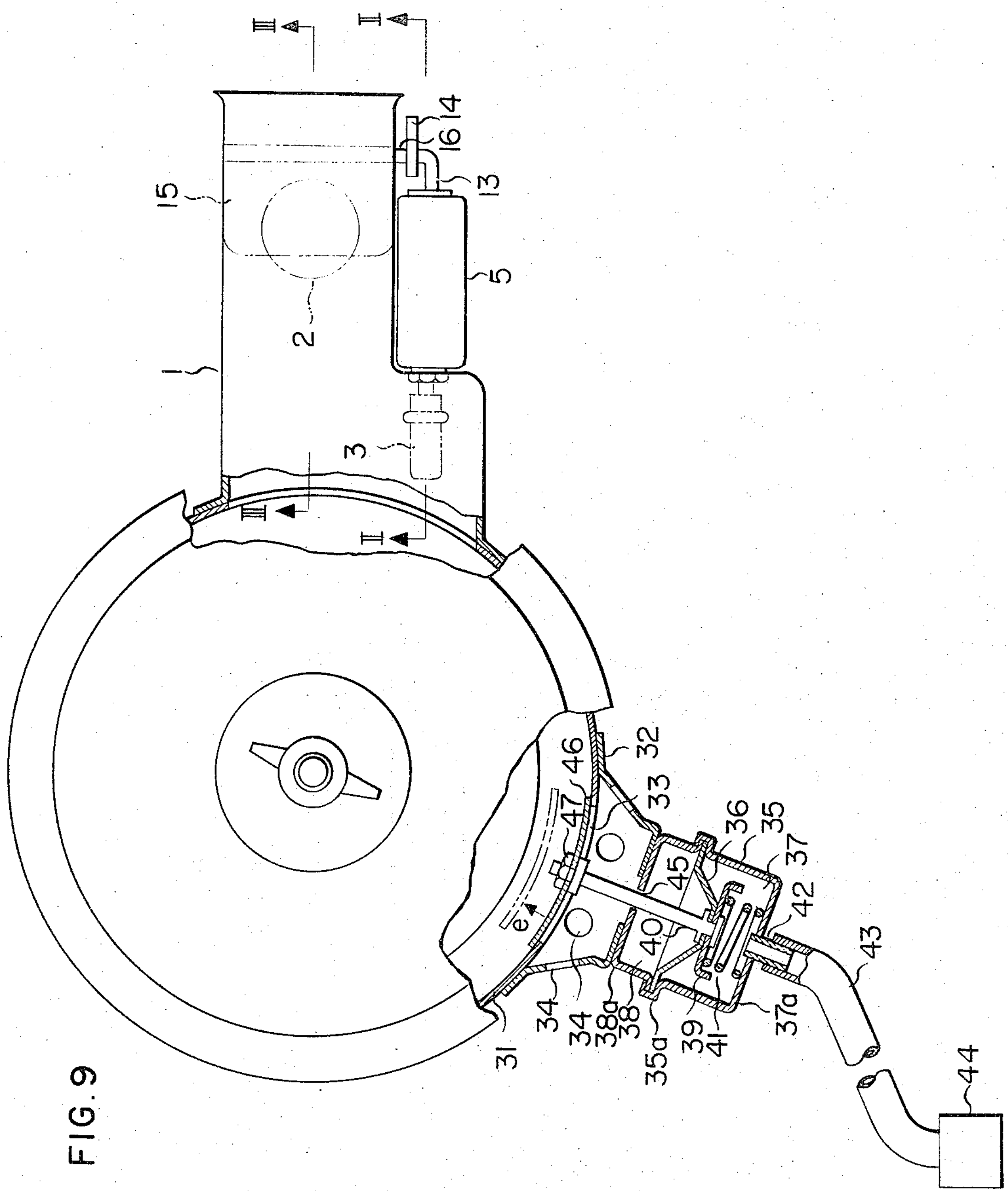
FIG. 9 is a fragmentary sectional plan view of an embodiment of the air cleaner with an intake air temperature automatic adjusting device, according to the invention.

Now, an air cleaner provided with the intake air temperature automatic adjusting device of the invention will be described by way of example with reference to FIG. 9. In FIG. 9, reference numeral 31 designates a casing of the air cleaner, with a filter element disposed therein, though not apparent in the Figure, and 32 designates an umbrella-shaped stay provided in a position to cover an auxiliary air intake opening 33 formed in the casing 31, said stay 32 being formed with a plurality of vent holes 34. Reference numeral 35 designates a diaphragm element having formed therein a negative pressure chamber 37 and an atmospheric pressure chamber 38 separated from each other by a diaphragm 36. A spring retainer 39 having a U-shaped cross section is provided on that side of the diaphragm 36 which is exposed in the negative pressure chamber 37. The diaphragm 36 and the spring retainer 39 are united together by clamp means provided at one end of a push rod 40, and a spring 41 is disposed between the spring retainer 39 and the confronting wall of the negative pressure chamber 37. A pipe 42 fixed to that part of a housing 37*a* of the diaphragm element which defines the negative pressure chamber 37 and one end of a hose 43 is connected to said pipe 42, with the other end thereof connected to the intake manifold 44 of the engine, to introduce the intake manifold vacuum pressure into the negative pressure chamber through said hose. The other end of the push rod 40 is slidably extended into the stay 32 through a hole 45 formed in that part 38*a* of the diaphragm element housing which defines the atmospheric pressure chamber 38. The part 37*a* of the diaphragm element housing defining the negative pressure chamber and the part 38*a* of the same defining the atmospheric pressure chamber are tightly connected with each other at the connecting portions 35*a*, with the diaphragm 36 clamped therebetween, and the latter part 38*a* of the housing is secured to the stay 32. A plate valve 46 is fixed to the other end of the push rod 40 by means of a lock nut 47, which has the same radius of curvature as the casing 31 and a size large enough to close the auxiliary air intake opening 33.

The intake air temperature automatic adjusting device of this air cleaner operates in the manner described previously. For instance, when the engine is rapidly accelerated to a speed higher than at the time of normal operation or is shifted into a high load operation phase, the intake air sucked from the main air intake pipe 1 and hot air intake pipe 2 is subjected to an increasing flow resistance created by the directional control valve 15, and an amount of air demanded by the engine cannot be supplied to said engine and a slight negative pressure, say on the other of 50 – 120 mmHg, in the intake manifold is introduced into the negative pressure chamber 37 of the diaphragm element 35. Since the negative pressure introduced into the negative pressure chamber 37 tends to bring about the state of equilibrium with the pressure in the atmospheric pressure chamber 38, the diaphragm 36 moves toward the atmospheric pressure chamber 38 under the biasing force of the spring 41, urging the plate valve 46 to move in the direction of the arrow *e* through the push rod 40. Thus, the auxiliary air intake opening 33 is opened and air flows into the air cleaner through the vent holes 34 formed in the stay 32 to make up the shortage of the intake air supplied from the main air intake pipe 1 and hot air intake pipe 2. When the engine has returned to its normal operation phase, the necessary amount of intake air for the engine can be supplied from the main air intake pipe 1 and the negative pressure in the intake manifold, say on the order of 150 – 500 mmHg, is introduced into the negative pressure chamber 37 of the diaphragm element 35, so that the diaphragm 36 moves in a direction to compress the spring 41, causing the plate valve 46 to close the auxiliary air intake opening 33 through the push rod 40.

In the type of air cleaner described above, the stay 32 having a plurality of vent holes 34 formed therein is fixed to the outside of the casing 31 and the diaphragm element 35 having the negative pressure chamber 37 and atmospheric pressure chamber 38 therein is fixed to said stay 32, but according to the present invention it is possible to form a plurality of vent holes in the peripheral wall of the atmospheric pressure chamber 38 of the diaphragm element 35 and fix said atmospheric pressure chamber directly to the casing 31.

As described above, in the air cleaner of the invention the auxiliary air intake opening is formed in the casing and the diaphragm element to operate the plate valve for opening and closing said auxiliary air intake opening is connected to the intake manifold of the internal combustion engine. Therefore, with the air cleaner of the invention, there can be obtained the remarkable advantage that air can be supplied to the engine at a substantially constant temperature within a certain temperature range and in an amount sufficient to meet the demand of the engine, even when said engine is rapidly accelerated or shifted into a high-load operation phase in a relatively low temperature weather. The air cleaner of the invention has the additional advantage that the disphragm element can be connected to an optional position on the outer surface of the air cleaner casing, without interfering with other elements within the engine room.

We claim:

1. An intake air temperature automatic adjusting device for internal combustion engines, comprising a temperature feeler (3) having a heat-sensitive expanding compound sealed therein and provided in a cold air intake pipe (1), a push rod (13) adapted to be operated by said feeler (3) and having a crank-shaped arm (**13*a*) at one end thereof, a cam (14) engaged with said arm (13*a*) and having formed therein a crank-shaped slot (14*a*) composed of a first slot section (14*c*) and a second slot section (14*d*), and a directional control valve (15) provided in said cold air intake pipe (1) for regulating the amount of air supplied from said cold air intake pipe (1) and the amount of air supplied from a hot air intake pipe (2) incident to movement of said cam (14), said directional control valve (15) being operated from said feeler (3) through said push rod (13) to be shifted between said cold air intake pipe (1) and said hot air intake pipe (2) as said arm (13*a*) slides in the first slot section (14*c*) of the crank-shaped slot (14*a*) of said cam (14) and said cam (14) absorbing a movement of said push rod (13) in excess of its preset stroke after said directional control valve (15) has been immovably set in its position, with said arm (13*a*) sliding in the second slot section (14*d*) of said crank-shaped slot (14*a***).

2. An air cleaner with the intake air temperature automatic adjusting device defined in claim 1, comprising a casing having an auxiliary air intake opening formed therein at a location other than where said main air intake pipe is connected, a plate valve adapted to open and close said auxiliary air intake opening and a diaphragm element to operate said plate valve connected to the intake manifold of an internal combustion engine.

3. An intake air temperature automatic adjusting device as defined in claim 1, wherein a spring (19) is provided to absorb a clearance between said arm (**13*a*) and said crank-shaped slot (14*a***).

* * * * *